United States Patent
Brechbuhl et al.

(10) Patent No.: US 10,778,628 B2
(45) Date of Patent: Sep. 15, 2020

(54) PREDICTIVE SCORING AND MESSAGING IN MESSAGING SYSTEMS

(71) Applicant: salesforce.com, inc., San Francisco, CA (US)

(72) Inventors: Brian Brechbuhl, Indianapolis, IN (US); John Grotland, Indianapolis, IN (US); Rick Munoz, San Francisco, CA (US); Leslie Fine, San Francisco, CA (US); Leah McGuire, Redwood City, CA (US); Shubha Nabar, Sunnyvale, CA (US); Vitaly Gordon, Sunnyvale, CA (US); Xiuchai (Meko) Xu, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 221 days.

(21) Appl. No.: 15/724,050

(22) Filed: Oct. 3, 2017

(65) Prior Publication Data
US 2018/0097759 A1    Apr. 5, 2018

Related U.S. Application Data

(60) Provisional application No. 62/403,547, filed on Oct. 3, 2016.

(51) Int. Cl.
*H04L 12/58* (2006.01)
*G06N 7/00* (2006.01)
(Continued)

(52) U.S. Cl.
CPC ............ *H04L 51/14* (2013.01); *G06F 16/248* (2019.01); *G06F 16/24578* (2019.01);
(Continued)

(58) Field of Classification Search
CPC ......... H04L 51/14; H04L 51/02; H04L 67/10; G06F 16/24578; G06F 16/248; G06N 7/005; H04W 4/12; G06Q 30/0277
See application file for complete search history.

(56) References Cited

U.S. PATENT DOCUMENTS 9,213,862 B1 * 12/2015 Spencer ................. H04L 67/02
2004/0153360 A1 * 8/2004 Schumann ............. G06Q 30/02
725/90

(Continued)

*Primary Examiner* — Viet D Vu
(74) *Attorney, Agent, or Firm* — Butzel Long

(57) ABSTRACT

A method for improving mass messaging in an electronic messaging system includes receiving recipient data describing a response of each of one or more recipients to receiving a prior message, generating predictor data based on the recipient data, where the predictor data indicates a plurality of predictors of recipient behavior in response to a message, identifying one or more top predictors of recipient behavior, the one or more top predictors being selected from among the plurality of predictors based on preferred recipient behaviors, generating, for each of the one or more recipients and from the recipient data, one or more predictive scores for each combination of top predictor and recipient, and assigning, based on one or more predictive scores of a specific recipient, the specific recipient to a specific persona, wherein the specific persona describes an expected behavior of the recipient.

21 Claims, 4 Drawing Sheets

(51) Int. Cl.
  *G06F 16/248* (2019.01)
  *G06F 16/2457* (2019.01)
  *H04W 4/12* (2009.01)
  *G06Q 30/02* (2012.01)
  *H04L 29/08* (2006.01)
  *G06N 20/20* (2019.01)

(52) U.S. Cl.
  CPC .............. *G06N 7/005* (2013.01); *H04L 51/02* (2013.01); *H04W 4/12* (2013.01); *G06N 20/20* (2019.01); *G06Q 30/0277* (2013.01); *H04L 67/10* (2013.01)

(56) References Cited

U.S. PATENT DOCUMENTS

| | | | | |
|---|---|---|---|---|
| 2010/0088152 | A1* | 4/2010 | Bennett | G06Q 30/02 705/14.19 |
| 2011/0055000 | A1* | 3/2011 | Zhang | G06N 20/00 705/14.43 |
| 2014/0156566 | A1* | 6/2014 | Kabiljo | G06Q 30/02 706/12 |
| 2016/0225025 | A1* | 8/2016 | Sinha | G06Q 30/0257 |
| 2017/0351417 | A1* | 12/2017 | Manico | G06N 5/022 |

* cited by examiner

PREDICTIVE SCORING AND MESSAGING IN MESSAGING SYSTEMS

The present application is related to U.S. patent application Ser. No. 62/279,755, titled "METHODS AND SYSTEMS FOR MACHINE LEARNING MODEL LEARNING MANAGEMENT", filed Jan. 16, 2016; U.S. patent application Ser. No. 62/402,899, titled "TECHNIQUES AND ARCHITECTURES FOR AUTOMATED MACHINE LEARNING", filed Sep. 30, 2016; and U.S. patent application Ser. No. 62/402,902, titled "TECHNIQUES AND METHODS FOR MODEL MANAGEMENT", filed Sep. 30, 2016; the entire disclosures of all of which are incorporated herein by reference for all purposes.

BACKGROUND

Use of email as a communication channel has grown greatly in recent years. However, conventional mass message communication techniques merely ask a person to subscribe, and then send the recipients large quantities of messages. In response to receiving the messages, human recipients react in many different respective manners—some recipients anxiously await messages from certain senders, and will click on an enclosed link to explore for a great deal, some recipients delete messages simply because the messages contain advertisements, and other recipients open a message only if they have time to kill. Conventional customer relations management (CRM) systems configured to perform recipient data analytics do not take into account recipient behavior in response to such messages and do not provide a way to segment and cluster recipients based on behaviors of individual recipients. The conventional CRM systems thus send millions of unwanted messages. This results in technical problems of wasting processor cycles, wasting energy, wasting transmission bandwidth, and wasting sender and recipient time on transmitting ineffective messages to recipients.

BRIEF DESCRIPTION OF THE DRAWINGS

The accompanying drawings, which are included to provide a further understanding of the disclosed subject matter, are incorporated in, and constitute a part of, this specification. The drawings also illustrate examples of the disclosed subject matter, and together with the detailed description, serve to explain the principles of examples of the disclosed subject matter. No attempt is made to show structural details in more detail than can be necessary for a fundamental understanding of the disclosed subject matter and various ways in which the disclosed subject matter can be practiced.

DETAILED DESCRIPTION

Figure 1:
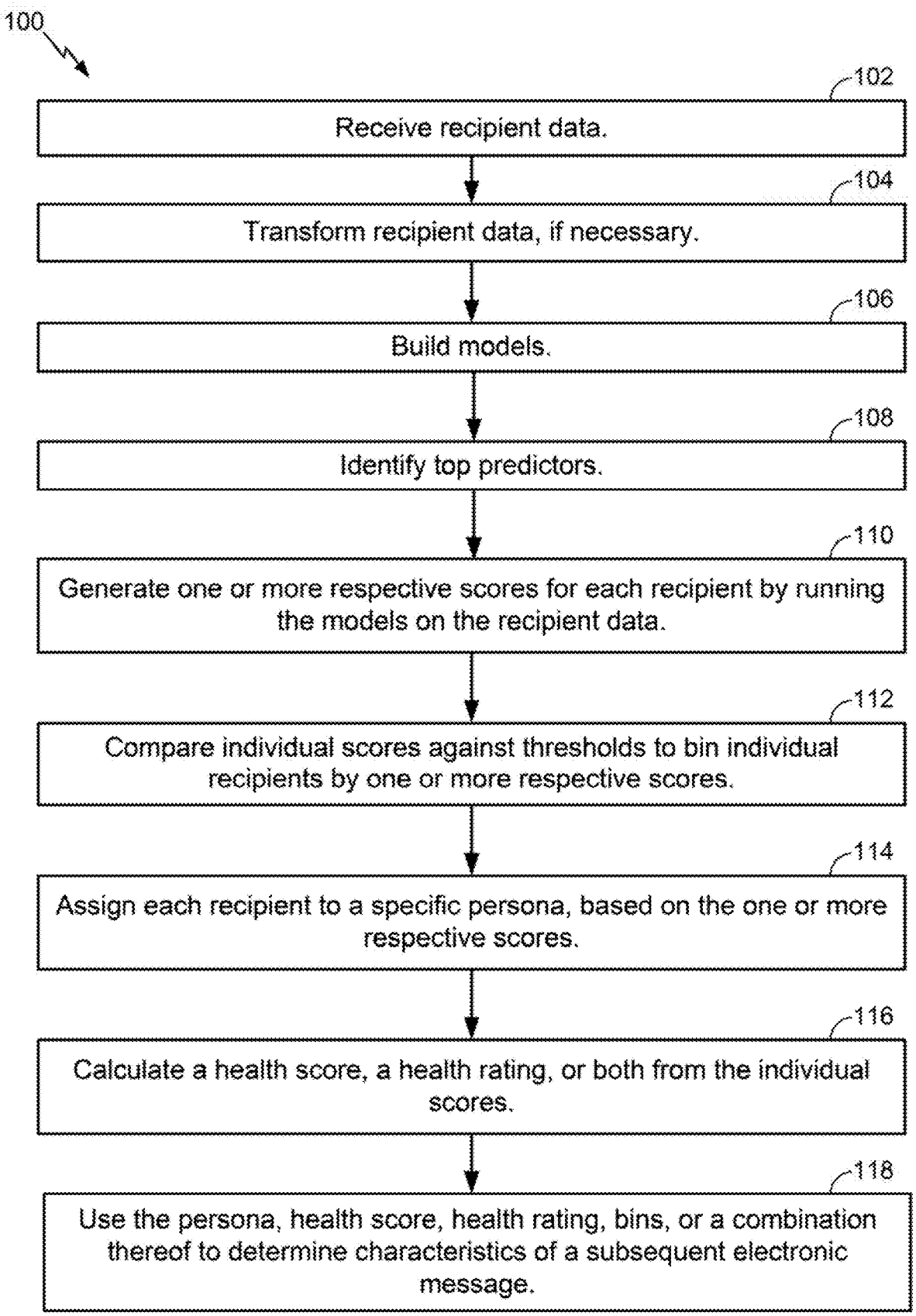
FIG. 1 depicts a flowchart illustrating an example of a method for predictive scoring, according to an example of the disclosed subject matter.

Provided are techniques (i.e., technical solutions) for causing a CRM system to automatically determine predictive scores for a recipient of electronic communications, such as a recipient to email messages, and assign the recipient to a specific persona, based on the predictive scores. The provided techniques can improve understanding of recipients' message and web engagement behaviors, can determine a likelihood of a recipient to engage in a message communication, and the like. As a specific example, the techniques and systems disclosed herein can determine the likelihood that a recipient will visit, purchase from, perform a conversion, or otherwise engage with a specific email communication, a mass email campaign, a location-based mailing, a type of communication, a website, or the like. A conversion can include a purchase, completing an on-line survey, filling out a mortgage application, the like, or a combination thereof. The provided techniques can also discover previously unknown patterns and trends that improve the efficiency of electronic communication programs, such as information distribution programs, advertising campaigns, and the like, thereby saving time and computing resources. The provided techniques can also identify, among a plurality of recipients, specific recipients to target with a future electronic message campaign, such as specific recipients to whom advertisements are to be sent. The provided techniques can also identify, among a plurality of recipients, specific recipients that should not be targeted with the future electronic advertising campaign. Thus, the provided technical solutions address and improve upon the aforementioned technical problems which occur when using conventional techniques. For example, by allowing a sender to improve a system's accuracy in identifying recipients most likely to respond to or otherwise engage with a particular electronic message, the sender can avoid wasting time sending a large number of messages that are unlikely to elicit a response from recipients, thereby greatly reducing the bandwidth and processing resources necessary to send the electronic messages, and making significantly more efficient use of those resources used to send the electronic messages.

In an example, provided is an improved system and technique for automatically identifying groups of recipients who share in-common predicted behaviors. In an example, the provided system and techniques can score individual recipients based on a predicted behavior of the recipient, such as a likelihood of a specific recipient to engage with an electronic communication sent to the recipient. In other words, recipients are grouped into recognizable personas based on likely engagement behavior, based on recipient scores identifying a likelihood of a recipient to engage in a specific action (or goal), such as opening a message, clicking on a link, making a purchase, performing a conversion, the like, or a combination thereof.

In examples, the provided technical solutions provide several beneficial improvements to conventional CRM messaging systems. The provided systems and techniques can save processor cycles, save energy, save transmission bandwidth, save time, save money on transmitting ineffective messages to recipients, or a combination thereof. The provided systems and techniques can also increase accuracy of data analytics, increase data processing efficiency, reduce work performed by a CRM system processor, or a combination thereof.

In examples, the provided technical solutions can reduce a number of recipients who unsubscribe to an electronic message subscription. The provided technical solutions can reduce a number of recipients who respond with a complaint that the messages are unwanted. These reductions can improve message deliverability to an Email Service Provider (ESP). Too many recipients who unsubscribe, a high number of recipients who respond with a complaint that the messages are unwanted, or both can result in messaging being delayed or even blocked from transmission, delivery, or both.

Thus, the disclosed methods and apparatuses can advantageously and beneficially improve on conventional techniques, and can improve functioning of a CRM system performing recipient data analytics.

FIG. 1 depicts a flowchart of an example method 100 to prepare and use predictive scores. In an example, the predictive scores can be used to assign a recipient to a specific persona indicating a likely future behavior of the recipient in response to the recipient receiving a message advertisement. A recipient can be a subscriber to one or more electronic communications, such as emails. In examples, the apparatus described herein, such as those described with reference to FIGS. 4-5, can be configured to perform at least in part the method 100.

In block 102, the CRM system receives recipient data. The recipient data can indicate a recipient's behavior in response to the recipient receiving a message advertisement. A recipient can be a person who has subscribed to receive advertising messages from a sender. The recipient data can include transactional data indicating: one or more message addresses, a number of messages sent to one or more recipients, a number of messages opened by one or more recipients, one or more subject lines of one or more respective messages, one or more senders of one or more respective messages, a respective internet protocol address of one or more message senders, if one or more recipients opens one or more message advertisements, a respective time of day that one or more recipients opens a message, a respective category of message for one or more messages, if one or more recipients click on a link in a respective message advertisement, if one or more recipients unsubscribes to receiving message advertisements, the like, or a combination thereof.

In cases where recipient purchases are considered, the recipient data can include purchase data indicating: if a respective recipient buys something from the webpage indicated by a link (i.e., performs a conversion activity), one or more products purchased by one or more respective recipients, one or more respective characteristics of one or more products (e.g., color, size, etc.), the like, or a combination thereof.

In other cases, equivalent data can be included. For example, where the electronic messages being evaluated relate to participation in a political or social campaign, the recipient data can include data such as whether a recipient has indicated that s/he has voted for a particular political party or elected position in the past, whether the recipient has supported a particular non-profit, political cause, or the like, or similar data.

The recipient data also can include message-independent data, such as the browser or email software types used by the recipient, the operating system, computer or processor type used by the recipient, or the like.

In an example, the recipient data can be collected over a period of time (e.g., during the prior 7 days, 30 days, 90 days, etc.).

In an example, the received data is received from a storage device, retrieved from the storage device, received via the Internet, or a combination thereof. In another example, the received data can be received and processed by the CRM system in real-time to provide timely results.

In optional block 104, the received recipient data can be analyzed by the CRM system to generate predictor data for respective predictors. Predictors are generated data type that identifies characteristics that can influence a likelihood of a specific recipient's behavior. Although the number of potential predictors is numerous, it has been discovered that certain predictors that will be referred to herein as "top predictors" can be selected and used in the automated messaging decision process, as will be discussed further below.

The full scope of potential predictors is too numerous to include here. The disclosed subject matter is limited to the predictors that have been discovered to have the greatest impact on CRM system accuracy and include: whether a specific message is opened, a number of messages sent to the recipient during a given time period (e.g., during the prior 7 days, 30 days, 90 days, etc.), a number of days since the recipient has subscribed, a message domain name of the recipient, a recipient bounce rate per message sent to the recipient, a number of message unsubscribes performed by the recipient in a given period of time (e.g., during the prior 7 days, 30 days, 90 days, etc.), whether the recipient has clicked on a link in the message, a type of message, content of the message, a time of day the message was sent, a category of message, a specific text in a header (e.g., a subject line), an determined importance of the title of the message, or a combination thereof. A bounced message is a message that was sent to a recipient, but is undeliverable to the recipient.

The disclosed predictor data that the CRM system generates from the recipient data can include hierarchical levels that increase in detail and information. For example, the "whether the message is opened" predictor can include a number of recipient opens during a time period (e.g., during the prior 7 days, 30 days, 90 days, etc.), a log transformation of a number of recipient opens, whether the recipients opens a message advertisements over a period of time (e.g., during the prior 7 days, 30 days, 90 days, etc.), the like, or a combination thereof.

In block 106, the CRM system builds models based on the predictor data. The models can be machine-learning models. In one embodiment, to build a model the CRM system performs an artificial intelligence-based logistic regression analysis on the predictor data. In another embodiment, the CRM system performs an artificial intelligence-based random forest analysis on the data. In another embodiment, the CRM system performs a combination of a logistic regression analysis and a random forest analysis on the data. In any case, the CRM system produces a probability distribution for each recipient and uses the model to identify a likelihood that a recipient will perform an action.

To improve accuracy, the CRM system can, for each recipient behavior for which a predictive score is created, use a respective model suited to or corresponding to the behavior. For example, the CRM system can use an "open model" that relates to whether a recipient will open an email, a "click model" that relates to whether a recipient will select a link within the email or otherwise interact with content in the email, an "unsubscribe model" that relates to whether a recipient will unsubscribe from receiving future email communications, a "conversion model" that relates to whether the recipient will make a conversion or take a similar action (e.g., a purchase) based upon the email, the like, or a combination thereof. For example, a model can perform text parsing on a subject line and determine a probability of a message having certain text in a subject line being opened, not opened, or both.

To provide increasing levels of improved, accurate prediction, the CRM system can dynamically update the models to match changes in recipient behavior. The updates can improve accuracy of the models to predict recipient behavior. For example, an input to a model can include a weight assigned to a top predictor. The weight can be based on a past history of a respective individual recipient. In one embodiment the CRM system can calculate the weight using a gradient descent analysis. The weights can be updated at a regular interval (e.g., monthly) to update the models.

In block 108, the CRM system identifies top predictors of recipients' behavior. As previously mentioned, predictors identify characteristics that influence a likelihood of a specific recipient's behavior. A top predictor identifies a power an effect size (e.g., a model weight) has on an overall outcome for a specific behavior.

A top predictor can have a positive or negative correlation with a specific preferred recipient behavior, where the preferred recipient behavior is an action taken by the recipient that is preferred by the sender of the message. For example, it can be preferred that a recipient open a future message advertisement. A top predictor of whether the recipient will open the future message advertisement can be "a number of messages the recipient has opened in the past 30 days." In one example, the CRM system can determine that the number of messages the recipient has opened in the past 30 days has a positive correlation to the recipient opening the future message advertisement, in which case the CRM system determines that a given recipient that has opened a large number of emails in the past 30 days would be more likely to open a future email communication.

Different top predictors can have different respective effects on the likelihood that the recipient will perform the preferred recipient behavior. For example, the CRM system can determine for a given recipient that "the number of messages the recipient has opened in the past 30 days" has a large effect on indicating whether the recipient will open the future message advertisement, while "a number of days since the recipient has joined" has a relatively small effect on indicating whether the recipient will open the future message advertisement.

Figure 3:
FIG. 3 shows an example of a display image depicting message open prediction, according to an example of the disclosed subject matter.

The CRM system can be configured to display at least one top predictor on a user display. FIG. 3 depicts a web page displaying top predictors, respective descriptions thereof, respective correlations thereof, and respective effects thereof.

In block 110, the CRM system analyses the predictor data and recipient data with the machine-learning models to generate predictive scores. The predictive scores can be numeric probabilities, per-person and per-top predictor, of a recipient performing an action related to a respective top predictor. The predictive scores can be represented by a percentage, a number between zero and one-hundred, a number between zero and one, a numeric value, a digital value, the like, or a combination thereof. The models can be run at a regular interval (e.g., daily) to update the predictive scores. As an example of the predictive scores, a collection of predictive scores for a specific recipient could be 10% open probability, 20% click probability, and 5% conversion probability.

In block 112, the CRM system compares individual predictive scores against thresholds to bin the individual recipients by predictive score. Binning also can combine predictive scores from multiple recipients to respective bins. In an example, the bins can be least likely, less likely, more likely, and most likely.

The thresholds separating the bins need not bin the data into 25%/50%/75% quartiles. In a non-limiting example, the thresholds for an "open message" can be 5%, 13%, and 27% from least likely to most likely, with a most likely open rate of 28% of the recipients being excellent. Thresholds for different recipient behaviors can be different. The thresholds can divide the bins into different ranges. In an example, the thresholds can be applicable to all industries. In an example, the thresholds can be industry-specific. The thresholds can be manually selected. The thresholds can be based on industry-standard threshold data.

In an example, the binning can be based on an importance of the action to be predicted. Thus, bins which are determined to be most predictive (based on test data, actual recipient data, etc.) can be used in updating a respective model. Top predictors can influence a size of the bins and thus a number of recipients included in each bin. For example, a size of a company sending the messages can have an influence on recipient behavior. Companies having one to fifty employees or over one-hundred employees can have a high message open rate, while companies having fifty-one to one-hundred employees can have a low message open rate.

Figure 2:
FIG. 2 shows an example of a display image depicting message engagement prediction, according to an example of the disclosed subject matter.

The CRM system can display a number of recipients in each bin for a specific recipient behavior. In an example, two recipient behaviors can be compared and contrasted by preparing a grid of respective bins (i.e., a heatmap). For example, recipient behaviors (e.g., actions) which can be compared and contrasted can include "email open engagement," "link click engagement," conversion engagement," "unsubscribe," the like, or a combination thereof. The heatmap can be displayed with a user display. FIG. 2 depicts an example of a sixteen-bin heatmap 210 comparing "email open engagement" to "email click engagement." A size of the total population of recipients can also be displayed on the user display.

In block 114, the CRM system assigns each recipient to a specific persona based on the recipient's predictive scores. The personas reflect the recipient's likely behavior in response to the recipient receiving a future message advertisement. The personas can bundle and identify recipients' behaviors in a manner which is understandable and upon which a response can be executed. The personas can identify a recipient's behavior with sufficient accuracy because people's behavior generally remains the same.

For example, the CRM system can assign recipients to one of four personas. In this example, the personas are based on a probability the recipients will open a message and a probability the recipients will click on a link in the message.

A first persona is a "loyalist" persona. A loyalist has a high probability of opening the message and a high probability of clicking on a link in the message.

A second persona is a "selective recipient" persona. A selective recipient has a low probability of opening the message and a high probability of clicking on a link in the message.

A third persona is a "window shopper" persona. A window shopper has a high probability of opening the message and a low probability of clicking on a link in the message.

A fourth persona is a "winback" persona, and can also be described as a "dormant" persona. A winback has a low probability of opening the message and a low probability of clicking on a link in the message.

The CRM system can combine bins when determining which persona is assigned to a specific person. In other words, recipients grouped in one bin can be combined with recipients grouped in a similar bin to form a general group having a high or low probability of performing an action.

For example, a bin of recipients who are "more likely" to open a message advertisement can be combined with a bin of recipients who are "most likely" to open a message advertisement, to form a resultant group having a high probability of opening the message. The recipients constituting the resultant group can then be assigned a persona based on a high probability of opening the message (e.g., "loyalists" or "window shoppers")

The CRM system can display a number of recipients in each persona on a user display. In an example, a percentage of recipients in each persona can be displayed with the user display. FIG. 2 depicts an example display of numbers of recipients in each of four personas.

In optional block 116, the CRM system calculates a health score, a health rating, or both from the individual scores. The health score indicates an average likelihood of all recipients in a group or list to perform an act. The acts which lead to the sale can include opening the message; clicking on a link in the message, where the link leads the recipient to a webpage associated with selling a product, a service, or both; buying the product, the service, or both; the like; or a combination thereof.

The health score can be calculated by determining an average predictive score of a total number of recipients and determining percentage by dividing the average predictive score by the total number of recipients. The health score can be calculated from a predictive score which is based on available predictors over a certain time period (e.g., 24 hours, 7 days, 14 days, 30 days, the like, etc.), and thus the health score is the same time period. A change in health score over time (e.g., 24 hours, 7 days, 14 days, 30 days, the like, etc.) can also be calculated from a current health score and at least one previously calculated health score. The change can be a percentage increase or decrease.

The health rating can be calculated by determining the average predictive score of the total number of recipients and binning the average predictive score. The bin (e.g., least likely, less likely, more likely, most likely) can correspond to a respective health rating (e.g., poor, fair, good, excellent).

A distribution of a likelihood that a recipient will perform a certain preferred behavior can be calculated from the respective predictive scores of a group of recipients.

The health score, the health rating, or a combination thereof can be displayed with a user display. FIGS. 2-3 depict an example of a health score (35.1%) of an average likelihood that a group of recipients will open a message advertisement, similar to one previously sent, in the future. FIGS. 2-3 also depict an example of a health rating ("good") of a group of recipients to whom message advertisements were previously sent. FIG. 3 also depicts an example distribution of a likelihood that a recipient will open a message advertisement sent in the future.

In optional block 118, the segmentation results, bin results, personas, heatmap, distribution, one or more predictive scores for a specific recipient, the like, or a combination thereof can be used by the CRM system to: determine a usefulness of a message list; understand model correlations affecting recipient engagement by providing details of why recipients are, and are not, engaging in response to message advertisements; segment recipient lists to identify and target different groups of recipients (e.g., based on persona); identify, for a targeted message advertising campaign, recipients more likely to open a message and click on a link; identify and not send a message to a recipient unlikely to open a message and click on a link; determine when to send a message advertisement; determine an optimum channel over which to send the message advertisement; determine a content of the message advertisement; optimize an expenditure on a subsequent message advertising campaign; determine a phone call should (or should not) be made to a recipient; the like; or a combination thereof.

In an example, the segmentation results, bin results, personas, heatmap, distribution, one or more predictive scores for a specific recipient, the like, or a combination thereof can be used to research issues relating to likelihood to engage by opening a message advertisement, click on a link, or both. For example, it can be determined what portion of a message list is inactive or unengaged. Message list health can be optimized with a re-engagement campaign targeting least likely to engage recipients and suppressing recipients who don't re-engage. Further, bulk promotional messaging can be based on engagement frequency to target less-active recipients with impactful messaging. Recipients who move from unengaged/low engaged to highly engaged can be tracked and targeted as recipients primed to purchase. Recipients can be reached during a time of research.

In an example, the segmentation results, bin results, personas, heatmap, distribution, one or more predictive scores for a specific recipient, the like, or a combination thereof can be used to research issues relating to recipients who are likely to unsubscribe. This type of research is not conventionally available. It can be determined what portion of a message list is likely to unsubscribe. This portion can be used to identify message content and message receipt frequency as bases for a recipient unsubscribing. Further, recipients likely to unsubscribe can be targeted in an opt-down advertising campaign which offers less frequent message communication, less frequent requests for a recipient to update the recipient's preferences, or both. This can beneficially increase accuracy and efficiency by reducing processor cycles, saving energy, saving transmission bandwidth, and saving sender and recipient time on transmitting ineffective messages to recipients.

In another example, the segmentation results, bin results, personas, heatmap, distribution, one or more predictive scores for a specific recipient, the like, or a combination thereof can be used to determine a likelihood of a recipient to perform a conversion (e.g., a purchase). Loyalist's behavior can be tracked, and the loyalist's behavior can be mimicked among other recipient segments.

In an example, the segmentation results, bin results, personas, heatmap, distribution, one or more predictive scores for a specific recipient, the like, or a combination thereof can be used to group recipients into defined market segments, and a specific advertising message can be sent to certain recipients in certain market segments (e.g., personas, groups based on predictive scores, etc.). A new recipient list can be created by combining message addresses of recipients having like personas. For example, respective message addresses of recipients assigned a "loyalist" persona can be combined into a "loyalist" recipient list. A subsequent message advertising campaign can send messages providing a specific offer to recipients on the "loyalist" recipient list. Further, recipients grouped as loyalists can be targeted with message advertising, special messaging, product recommendations, discount updates, the like, or a combination thereof. Moreover, recipients who are not likely to perform a conversion can be targeted with a win-back advertising campaign (e.g., by offering an incentive to shop with your brand). This can beneficially increase accuracy and efficiency by reducing processor cycles, saving energy, saving transmission bandwidth, and saving sender and recipient time on transmitting ineffective messages to recipients.

In an example, the segmentation results, bin results, personas, heatmap, distribution, one or more predictive scores for a specific recipient, the like, or a combination thereof can form data used to determine a respective viability (e.g., a degree of viability) of one or more sales leads. The data to be analyzed can also include data describing a title, a recent electronic communication, a calendar, a size of an associated company, a product line, the like, or a combination thereof. The data describing characteristics of the sales lead is analyzed to determine the respective viability of the one or more sales leads. The analysis of the data can include determining a respective capability of the one or more of the sales leads to respond to one or more electronic communications. The analysis of the data can include determining when to best contact the one or more sales leads, how to best contact the one or more sales leads, where to best contact the one or more sales leads, the like, or a combination thereof. The results of the data analysis enable an improvement in a quantity and accuracy of data describing the one or more sales leads. The results of the data analysis can rank one or more sales leads in a collection of sales leads. The ranking the sales leads enables selecting which of the sales leads should be pursued (e.g., with a subsequent electronic communication, the like, etc.). In an example, the selecting which sales leads should be disregarded can be automatically performed. The ranking the sales leads can also enable selecting which of the one or more sales leads should be disregarded. In an example, the selecting which of the one or more sales leads should be disregarded can be based on the results of the data analysis, can be automatically performed, or both. This enables focusing resources on recipients who are more likely to convert, thus these techniques can beneficially reduce processor cycles, save energy, save transmission bandwidth, and save sender and recipient time by not transmitting ineffective messages to recipients. Further, using predictive scoring can also enable scaling the data analysis, proving statistically-significant scores, or both.

In an example, a first sales lead having a relatively higher predictive score indicating a relatively higher probability to perform a conversion is ranked higher than a second sales lead having a relatively lower predictive score indicating a relatively lower probability to perform a conversion. Recipients can be displayed, on a user display, in a chart by rank. The chart can include additional respective details for each recipient. The additional details can include data describing rank, email address, name, postal code, industry description, a phone number, a lead status, an owner alias, a title, a clickable button configured to initiate sending an email to the recipient, a clickable button configured to initiate an electronic call to the recipient, the like, or a combination thereof.

In an example, recipients can be sorted and the results of the sort displayed. The sorting can be by any one, or more, of the predictive scores, the additional details, or both.

In an example, one or more of the results of the data analysis, the ranking, an indication of one or more sales leads to be pursued, an indication of or more sales leads to be disregarded, the like, or a combination thereof can be displayed on a user display.

The method 100 can be implemented using a host CRM system computing infrastructure. The host infrastructure can include at least a processor and a memory. A user interface operating at a user client device located remotely from the host infrastructure can communicatively interface with the host infrastructure via a public Internet. The host infrastructure can operate as a cloud-based service provider to the user client device. Using a cloud-based service provider enables scaling a number of processors used to perform at least a part of a method described herein, which advantageously and beneficially reduces processing cycles, energy, and processing expenses.

FIG. 2 shows an example of a display image 200 depicting message engagement prediction, according to an example of the disclosed subject matter. The display image 200 depicts an example display of numbers of recipients in each of four personas. The display image 200 also depicts an example sixteen-bin heatmap 210 comparing "email open engagement" to "email click engagement." Further depicted is an example of a health score (e.g., 35.1%) of an average likelihood that a group of recipients will open a message advertisement, similar to one previously sent, subsequently sent. The display image 200 also depicts an example of a health rating (e.g., "good") of a group of recipients to whom a message advertisement was previously sent. The data depicted by, and arrangement of features on, the display image 200 is illustrative, and not limiting.

FIG. 3 shows an example of a display image 300 depicting message open prediction, according to an example of the disclosed subject matter. The display image 300 depicts an example of a health score (e.g., 35.1%) of an average likelihood that a group of recipients will open a message advertisement, similar to one previously sent, in the future. The display image 300 also depicts an example of a health rating (e.g., "good") of a group of recipients to whom a message advertisement was previously sent. The display image 300 also depicts an example distribution of a likelihood that a recipient will open a message advertisement sent in the future. The display image 300 displays top predictors, respective descriptions thereof, respective correlations thereof, and respective effects thereof. The data depicted by, and arrangement of features on, the display image 300 is illustrative, and not limiting.

Figure 4:
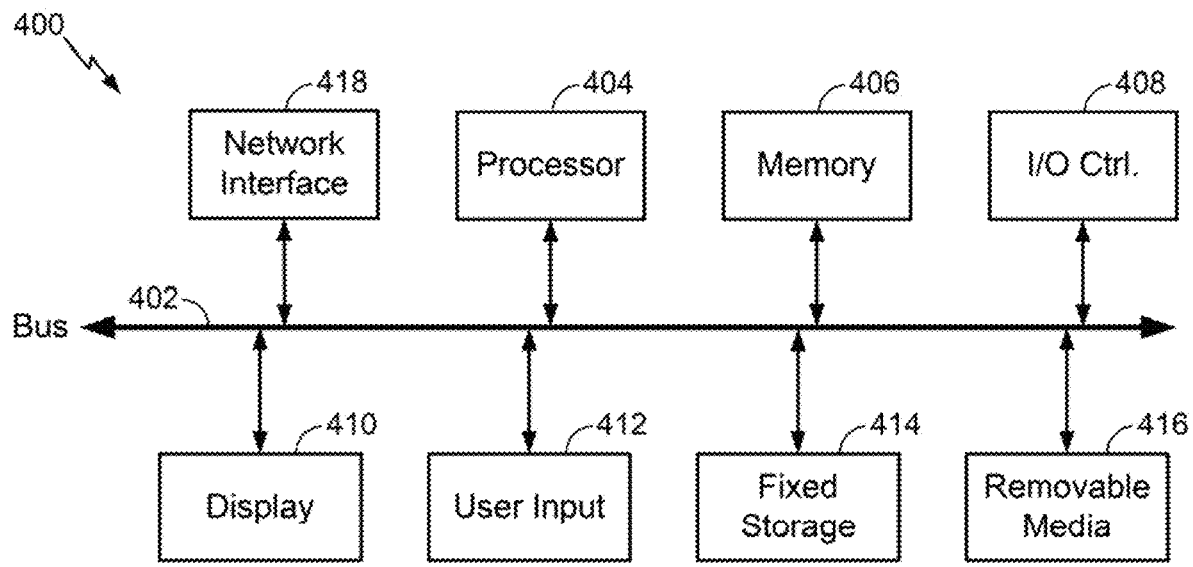
FIG. 4 shows a computer, according to an example of the disclosed subject matter.

Examples of the presently disclosed subject matter can be implemented in and used with a variety of component and network architectures, and are not necessarily limited to a multi-tenant system. FIG. 4 is an example of a computer 400 suitable for implementations of the presently disclosed subject matter. At least one element of the computer 400 can be configured to perform at least a portion of a method described herein. The example of the computer as shown in FIG. 4 can be a client device, a remote platform, or a server on which the disclosed CRM systems and methods can be performed.

As shown in FIG. 4, the computer 400 includes a bus 402 which interconnects major components of the computer 400, such as a central processor 404, a memory 406 (typically RAM, but which can also include ROM, flash RAM, or the like), an input/output controller 408, a user display 410, such as a display screen via a display adapter, a user input interface 412, which can include one or more controllers and associated user input devices such as a keyboard, mouse, and the like, and can be closely coupled to the I/O controller 408, fixed storage 414, such as a hard drive, flash storage, Fiber Channel network, SAN device, SCSI device, and the like, and a removable media component 416 operative to control and receive an optical disk, flash drive, the like, or a combination thereof.

The bus 402 allows data communication between the central processor 404 and the memory 406, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 400 are generally stored on and accessed via a computer readable medium, such as a hard disk drive (e.g., fixed storage 414), an optical drive, floppy disk, or other storage medium.

The fixed storage 414 can be integral with the computer 400 or can be separate and accessed through other interfaces. A network interface 418 can provide a direct connection to a remote server via a wired or wireless telephone link, a cable link, an optical fiber link, a satellite link or the like, to the Internet via an Internet service provider (ISP), or a direct connection to a remote server via a direct network link to the Internet via a POP (point of presence) or other technique. The network interface 418 can provide such connection using wireless techniques, including digital cellular telephone connection, Cellular Digital Packet Data (CDPD) connection, digital satellite data connection or the like. For example, the network interface 418 can allow the computer to communicate with other computers via one or more local, wide-area, or other networks, as shown in FIG. 5.

Many other devices or components (not shown) can be connected in a similar manner (e.g., document scanners, digital cameras and so on). Conversely, not all of the components shown in FIG. 4 need be present to practice the present disclosure. The components can be interconnected in different ways from that shown. The operation of a computer such as that shown in FIG. 4 is readily known in the art and is not discussed in detail in this application. Code (i.e., instructions) configured to implement the present disclosure can be stored in computer-readable storage media such as one or more of the memory 406, fixed storage 414, removable media 416, or on a remote storage location.

Figure 5:
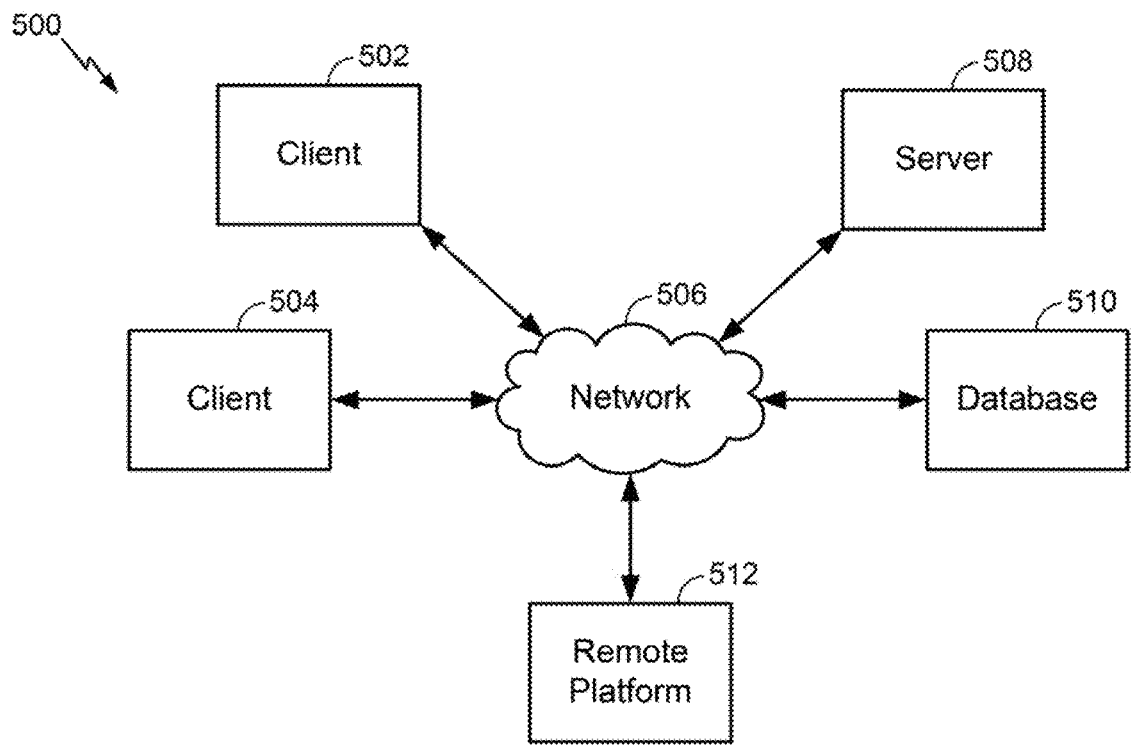
FIG. 5 shows a network configuration, according to an example of the disclosed subject matter.

FIG. 5 shows an example network 500 according to an example of the disclosed subject matter. At least one element of the example network 500 can be configured to perform at least a portion of a method described herein. One or more clients 502 and/or 504, such as local computers, smart phones, tablet computing devices, and the like can connect to other devices via one or more networks 506. The network 500 can be a local network, wide-area network, the Internet, or any other suitable communication network or networks, and can be implemented on any suitable platform including wired and/or wireless networks. The clients can communicate with one or more servers 508 and/or databases 510. The devices can be directly accessible by the clients 502, 504, or one or more other devices can provide intermediary access such as where the server 508 provides access to resources stored in the database 510. The clients 502, 504 also can access a remote platform 512 or services provided by the remote platform 512 such as cloud computing arrangements and services. The remote platform 512 can include the one or more servers 508 and/or the database 510. At least a part of a methods described herein can be performed on one or more of the servers, databases, remote platforms, or client devices in various examples within the scope of the disclosed subject matter.

The provided systems and methods can be implemented as a multi-tenant system. A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

The system can include a server that can generate one or more virtual applications based on data stored in a common database shared between the tenants. Each virtual application can provide access to data in the database for each of the one or more tenants utilizing the system. A tenant can, for example, request social media posts, metadata, and/or analytics provider data. Although multiple tenants can share access to a common server and database, the particular data and services provided from the system to each tenant can be securely isolated from those provided to other tenants. The multi-tenant architecture therefore allows different sets of users to share functionality without necessarily sharing their private data. Similarly, the appearance of the interface of each tenant with the system can be unique.

More generally, various examples of the presently disclosed subject matter can include or be implemented in the form of computer-implemented processes and apparatuses for practicing those processes. Examples also can be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing examples of the disclosed subject matter. Examples also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing examples of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Examples can be implemented using hardware that can include a processor, such as a general purpose microprocessor and/or an Application Specific Integrated Circuit (ASIC) that implements all or part of the techniques according to examples of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to examples of the disclosed subject matter.

Within this description, the singular portends the plural where practicable. This description, for purpose of explanation, has been described with reference to specific examples. However, the illustrative discussions are not intended to be exhaustive or to limit examples of the disclosed subject matter to the precise forms disclosed. Many modifications and variations are possible in view of the above teachings. The examples were chosen and described to explain the principles of examples of the disclosed subject matter and their practical applications, to thereby enable others skilled in the art to utilize those examples as well as various examples with various modifications as can be suited to the particular use contemplated.

We claim:

1. A method for improving mass messaging in an electronic messaging system by automatically determining a likelihood of a recipient response to a future electronic message, the method comprising:
   receiving recipient data describing a response of each of one or more recipients to receiving a prior electronic message;
   generating predictor data based on the recipient data, where the predictor data indicates a plurality of predictors of recipient behavior in response to a first electronic message;
   generating a machine-learning model based on the predictor data;
   identifying one or more top predictors of recipient behavior, the one or more top predictors being selected from among the plurality of predictors based on preferred recipient behaviors;
   generating, by executing the machine-learning model for each of the one or more recipients and from the recipient data, one or more predictive scores for each combination of top predictor and recipient, each predictive score indicating a likelihood that a recipient of the one or more recipients will perform an action in response to receiving a second electronic message, wherein the one or more predictive scores include
      a first predictive score indicating a likelihood that the recipient of the one more recipients will perform a first action in response to receiving the second electronic message, and
      a second predictive score indicating a likelihood that the recipient of the one more recipients will perform a second action in response to receiving the second electronic message;
   assigning, based on the first and second predictive scores of a specific recipient, the specific recipient to a specific persona, wherein the specific persona describes an expected engagement behavior of the specific recipient to engage in the first and second actions in response to receiving the second electronic message; and
   sending the second electronic message to the specific recipient based on assigning the specific recipient to the specific persona.

2. The method of claim 1, further comprising:
   binning the one or more recipients by comparing each of the one or more predictive scores for each of the one or more recipients against one or more thresholds; and
   displaying, on a user display, the results of the binning.

3. The method of claim 2, further comprising:
   forming a heatmap from information describing the contents of each bin; and
   displaying, on the user display, the heatmap.

4. The method of claim 1, further comprising using the specific persona to at least one of:
   determine characteristics of a subsequent message advertisement, or
   determine when to send a specific future message to the specific recipient.

5. The method of claim 1, further comprising calculating at least one of a health score and a health rating from the one or more predictive scores.

6. The method of claim 5, further comprising using the at least one of the health score and the health rating to determine characteristics of a subsequent message.

7. An improved messaging system for determining a likelihood of a recipient to engage a future electronic message advertisement, the system comprising:
   a processor; and
   a memory communicably coupled to the processor, wherein the memory includes computer instructions configured to cause the processor to:
      receive recipient data describing a response of each of one or more recipients to receiving a prior electronic message;
      generate predictor data based on the recipient data, the predictor data indicating a plurality of predictors of recipient behavior in response to a first electronic message;
      generate a machine-learning model based on the predictor data;
      identify one or more top predictors of recipient behavior, the one or more top predictors being selected from among the plurality of predictors based on preferred recipient behaviors;
   generate, by executing the machine-learning model for each of the one or more recipients and from the recipient data, one or more predictive scores for each combination of top predictor and recipient, each predictive score indicating a likelihood that a recipient of the one or more recipients will perform a specific action based on receiving a second electronic message, wherein the one or more predictive scores include
      a first predictive score indicating a likelihood that the recipient of the recipient will perform a first specific action in response to receiving the second electronic message, and
      a second predictive score indicating a likelihood that the recipient of the recipient will perform a second specific action in response to receiving the second electronic message;
      assign, based on the first and second predictive scores of a specific recipient, the specific recipient to a specific persona, wherein the specific persona describes an expected engagement behavior of the specific recipient to engage in the specific first and second actions based on receiving the second electronic message; and
      send the second electronic message to the specific recipient based on assigning the specific recipient to the specific persona.

8. The system of claim 7, wherein the computer instructions further comprise computer instructions configured to cause the processor to:
   bin the one or more recipients by comparing the respective one or more predictive scores of the one or more recipients against one or more thresholds; and
   display, on a user display, the results of the binning.

9. The system of claim 8, wherein the computer instructions further comprise computer instructions configured to cause the processor to:
   form a heatmap from information describing the contents of each bin; and
   display, on the user display, the heatmap.

10. The system of claim 7, wherein the computer instructions further comprise computer instructions configured to cause the processor to use the specific persona to at least one of:

determine characteristics of a subsequent message advertisement, or determine when to send a specific future message to the specific recipient.

11. The system of claim 7, wherein the computer instructions further comprise computer instructions configured to cause the processor to calculate at least one of a health score and a health rating from the one or more predictive scores.

12. The system of claim 11, wherein the computer instructions further comprise computer instructions configured to cause the processor to use the at least one of the health score and the health rating to determine characteristics of a subsequent message advertisement.

13. The system of claim 7, wherein:

the system is implemented using a host computing infrastructure;

the host computing infrastructure includes at least the processor and the memory;

a user interface operates at a user client device located remotely from the host computing infrastructure and communicatively interfaces with the host computing infrastructure via a public Internet; and the host computing infrastructure operates as a cloud-based service provider to the user client device.

14. A non-transitory computer-readable storage medium comprising instructions stored thereon which are configured to cause a processor in a host organization to perform operations, wherein the operations include:

receiving recipient data describing a response of each of one or more recipients to receiving a prior electronic message;

generating predictor data based on the recipient data, the predictor data indicating a plurality of predictors of recipient behavior in response to a first electronic message;

generating a machine-learning model based on the predictor data;

identifying one or more top predictors of recipient behavior, the one or more top predictors being selected from among the plurality of predictors based on preferred recipient behaviors;

generating, by executing the machine-learning model for each of the one or more recipients and from the recipient data, one or more predictive scores for each combination of top predictor and recipient, each predictive score indicating a likelihood that a recipient of the one or more recipients will perform an action in response to receiving a second electronic message wherein the one or more predictive scores include a first predictive score indicating a likelihood that the recipient of the recipient will perform a first action in response to receiving the second electronic message, and a second predictive score indicating a likelihood that the recipient of the recipient will perform a second action in response to receiving the second electronic message;

assigning, based on the first and second predictive scores of a specific recipient, the specific recipient to a specific persona, wherein the specific persona describes an expected engagement behavior of the specific recipient to engage in the first and second actions based on receiving the second electronic message; and sending the second electronic message to the specific recipient based on assigning the specific recipient to the specific persona.

15. The non-transitory computer readable storage medium of claim 14, wherein the operations further include:

binning the one or more recipients by comparing the respective one or more predictive scores of the one or more recipient's respective against one or more thresholds; and displaying, on a user display, the results of the binning.

16. The non-transitory computer readable storage medium of claim 15, wherein the operations further include:

forming a heatmap from information describing the contents of each bin; and displaying, on the user display, the heatmap.

17. The non-transitory computer readable storage medium of claim 14, wherein the operations further include using the specific persona to at least one of:

determine characteristics of a subsequent message advertisement, or determine when to send a specific future message to the specific recipient.

18. The non-transitory computer readable storage medium of claim 14, wherein the operations further include calculating at least one of a health score and a health rating from the one or more predictive scores.

19. The non-transitory computer readable storage medium of claim 18, wherein the operations further include using the at least one of the health score and the health rating to determine characteristics of a subsequent message advertisement.

20. The non-transitory computer readable storage medium of claim 14, wherein the operations are configured to be implemented using:

a host computing infrastructure, wherein the host computing infrastructure includes at least the processor and a memory; and a user interface configured to operate at a user client device located remotely from the host computing infrastructure and communicatively interfaces with the host computing infrastructure via a public Internet, wherein the host computing infrastructure is further configured to operate as a cloud-based service provider to the user client device.

21. A method for improving mass messaging in an electronic messaging system by automatically determining a likelihood of a recipient response to a future electronic message, the method comprising:

receiving recipient data describing a response of each of one or more recipients to receiving a prior electronic message;

generating predictor data based on the recipient data, where the predictor data indicates a plurality of predictors of recipient behavior in response to a first electronic message;

generating a machine-learning model based on the predictor data;

identifying one or more top predictors of recipient behavior, the one or more top predictors being selected from among the plurality of predictors based on preferred recipient behaviors;

generating, by executing the machine-learning model for each of the one or more recipients and from the recipient data, one or more predictive scores for each combination of top predictor and recipient;

assigning, based on one or more predictive scores of a specific recipient, the specific recipient to a specific persona, wherein the specific persona describes an expected behavior of the recipient;

sending a second electronic message to the specific recipient based on the specific persona;

forming a heatmap based on the one or more predictive scores; and
displaying, on a user display, the heatmap.

* * * * *